(12) United States Patent
Abram

(10) Patent No.: US 7,606,025 B2
(45) Date of Patent: Oct. 20, 2009

(54) DOCKING STATION

(75) Inventor: Richard Anthony Abram, West Midlands (GB)

(73) Assignee: Tempus Computers Limited, Birmingham (GB)

( * ) Notice: Subject to any disclaimer, the term of this patent is extended or adjusted under 35 U.S.C. 154(b) by 105 days.

(21) Appl. No.: 11/703,743

(22) Filed: Feb. 8, 2007

(65) Prior Publication Data

US 2007/0201202 A1    Aug. 30, 2007

(30) Foreign Application Priority Data

Feb. 9, 2006    (GB) ................................. 0602574.6

(51) Int. Cl.
 *G06F 1/16*    (2006.01)
(52) U.S. Cl. ........................ 361/686; 439/341; 439/929
(58) Field of Classification Search ................. 361/727, 361/683, 686, 685; 439/141, 341, 725, 929
See application file for complete search history.

(56) References Cited

U.S. PATENT DOCUMENTS

| | | | |
|---|---|---|---|
| 4,809,360 A * | 2/1989 | Kraft ........................... | 361/727 |
| 5,627,727 A | 5/1997 | Aguilera et al. | |
| 5,687,060 A | 11/1997 | Ruch et al. | |
| 5,875,094 A | 2/1999 | Kirkendoll | |
| 5,888,087 A * | 3/1999 | Hanson et al. ............... | 439/374 |
| 5,964,601 A * | 10/1999 | Tsurumaru et al. .......... | 439/141 |
| 6,115,245 A * | 9/2000 | Ruch et al. ................... | 361/685 |
| 6,185,094 B1 | 2/2001 | Ruch et al. | |
| 6,193,546 B1 * | 2/2001 | Sadler ......................... | 439/534 |
| 6,252,765 B1 * | 6/2001 | Balzaretti et al. ........... | 361/683 |
| 6,643,127 B1 | 11/2003 | Richardson | |
| 7,381,075 B2 * | 6/2008 | Gontarek et al. ............ | 439/341 |
| 2004/0145864 A1 | 7/2004 | Usui et al. | |

FOREIGN PATENT DOCUMENTS

EP    1 302 368 A2    4/2003

OTHER PUBLICATIONS

Search Report issued Oct. 19, 2006 in corresponding GB 0602574.6.
International Search report for PCT/GB2007/000444 dated Feb. 11, 2008.

\* cited by examiner

*Primary Examiner*—Michael C Zarroli
(74) *Attorney, Agent, or Firm*—Buchanan Ingersoll & Rooney PC

(57) ABSTRACT

A computer dock having a device for protecting a portable computer against damage during vertical or inclined insertion within the computer dock. The computer dock includes an abutment member, slidably mounted on a rail, and biased to an upper position when the dock is not in use; the abutment member moving downwardly as a result of abutment against a portable computer during insertion, and at the same time exerting an upward force that at least in part counteracts the downward force of gravity acting on the portable computer.

13 Claims, 6 Drawing Sheets

DOCKING STATION

BACKGROUND OF THE INVENTION

This invention relates to a docking station for use with a notebook computer and in particular features of the docking station that help to avoid any damage during insertion of a computer within the docking station.

GB 2412503A discloses a computer dock comprising a cradle member forming part of an enclosure suitable for receiving a portable computer such as a laptop. The cradle member has two extreme positions an open position in which the portable computer may be inserted and a closed position in which electrical connection is automatically made between the computer dock and electrical interface terminals located on the underside of the portable computer. The portable computer is securely enclosed and retained when the docking port is in the closed position. This type of docking port is particularly well suited for use where the portable computer is inserted in a generally horizontal manner. However, it has been found that when used to allow vertical (downward) insertion of a portable computer that the computer may, due to the force of gravity sharply impact the base of the docking port with consequent risk of damage to both the computer and the dock; especially to electrical interface terminals. In addition to possible internal or external damage to the computer and internal damage to the computer dock it is also likely that significant impact during insertion of a computer will result in loss of data due to a short term adverse effect to the computer hard disc etc.. Damage to the computer or the dock can also occur if a user attempts to close a dock before the computer is fully inserted.

BRIEF SUMMARY OF INVENTION

An aim of the present invention is to provide an improved computer dock that in part at least overcomes some or all of the above disadvantages.

In one aspect the invention comprises a computer dock comprising a device for protecting a portable computer against damage during vertical or inclined insertion within the computer dock having an abutment member biased to an upper position when the dock is not in use; said abutment member moving downwardly as a result of abutment against a portable computer during insertion thereof and at the same time exerting an upward force that at least in part counteracts the downward force of gravity acting on the portable computer.

Preferably, the abutment member is slidably mounted to a track such that the abutment member moves downwardly during insertion of a computer within the computer dock.

Preferably, the abutment member comprises an arm that extends outwardly in a direction substantially at right angles to the direction of movement of the abutment member. The abutment member may be biased by resilient means; and the resilient means may include a spring or a pneumatic damper. The longitudinal axis of the damper arm may extend along a line that is at an acute angle to the direction of movement of the abutment member. A pivot joint may be provided at one or both ends of the damper arm. Preferably, one end of the damper arm is pivotally connected to the abutment member. The abutment member may be generally "L-shaped".

In another aspect the invention comprises a device for protecting a portable computer against damage during vertical or inclined insertion within a docking station; in use forming part of the docking station; and comprising an abutment member biased to an upper position when the dock is not in use; said abutment member moving downwardly as a result of abutment against a portable computer during insertion and at the same time exerting an upward force that at least in part counteracts the downward force of gravity acting on the portable computer.

BRIEF DESCRIPTION OF DRAWINGS

The invention will now be described by reference to the following diagrammatic figures in which.

DETAILED DESCRIPTION OF INVENTION

Figure 1:
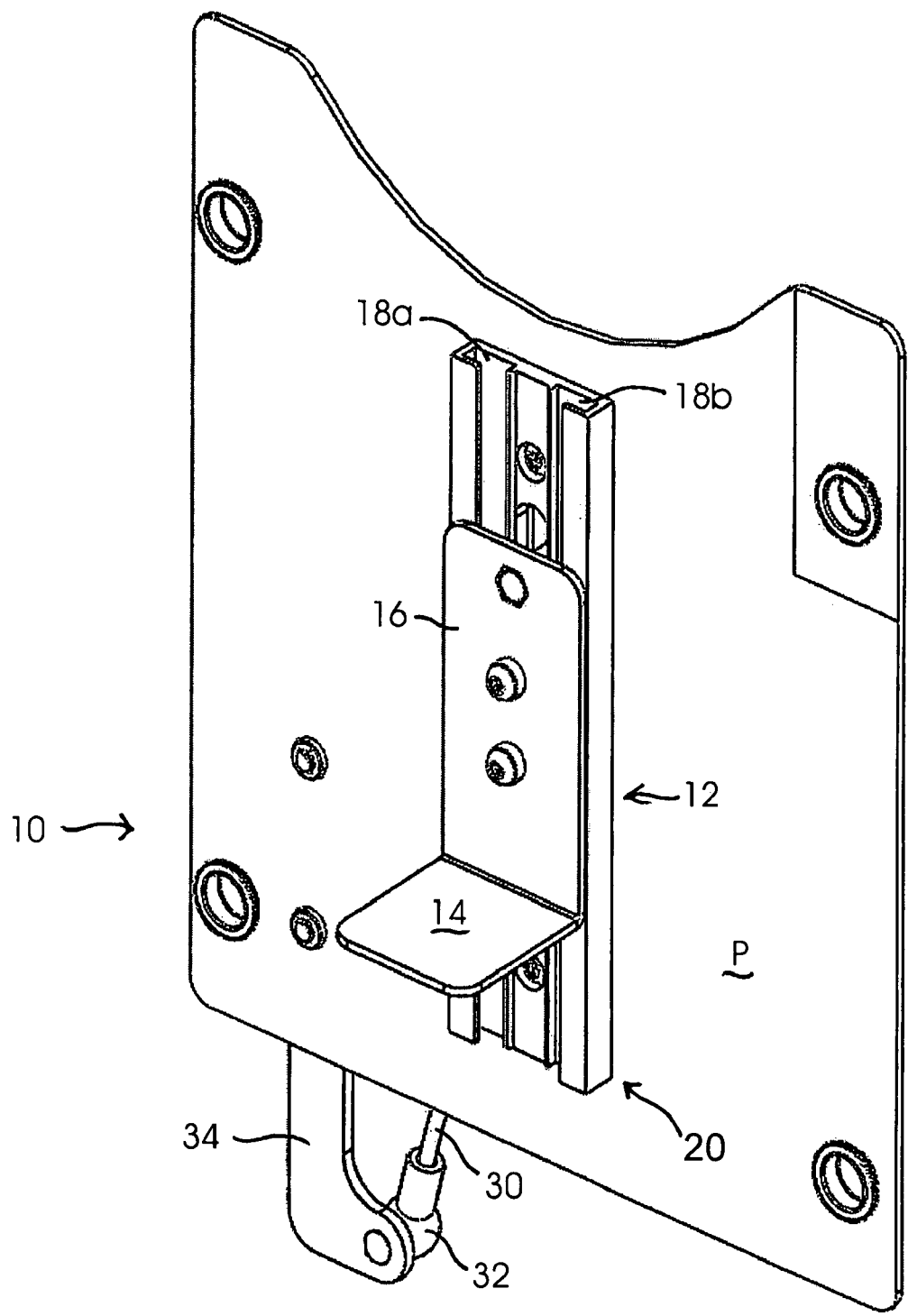
FIG. 1 shows a front perspective view of a device according to the invention mounted on an internal wall of a computer dock showing the position of abutment member when the dock is not in use.
Figure 2:
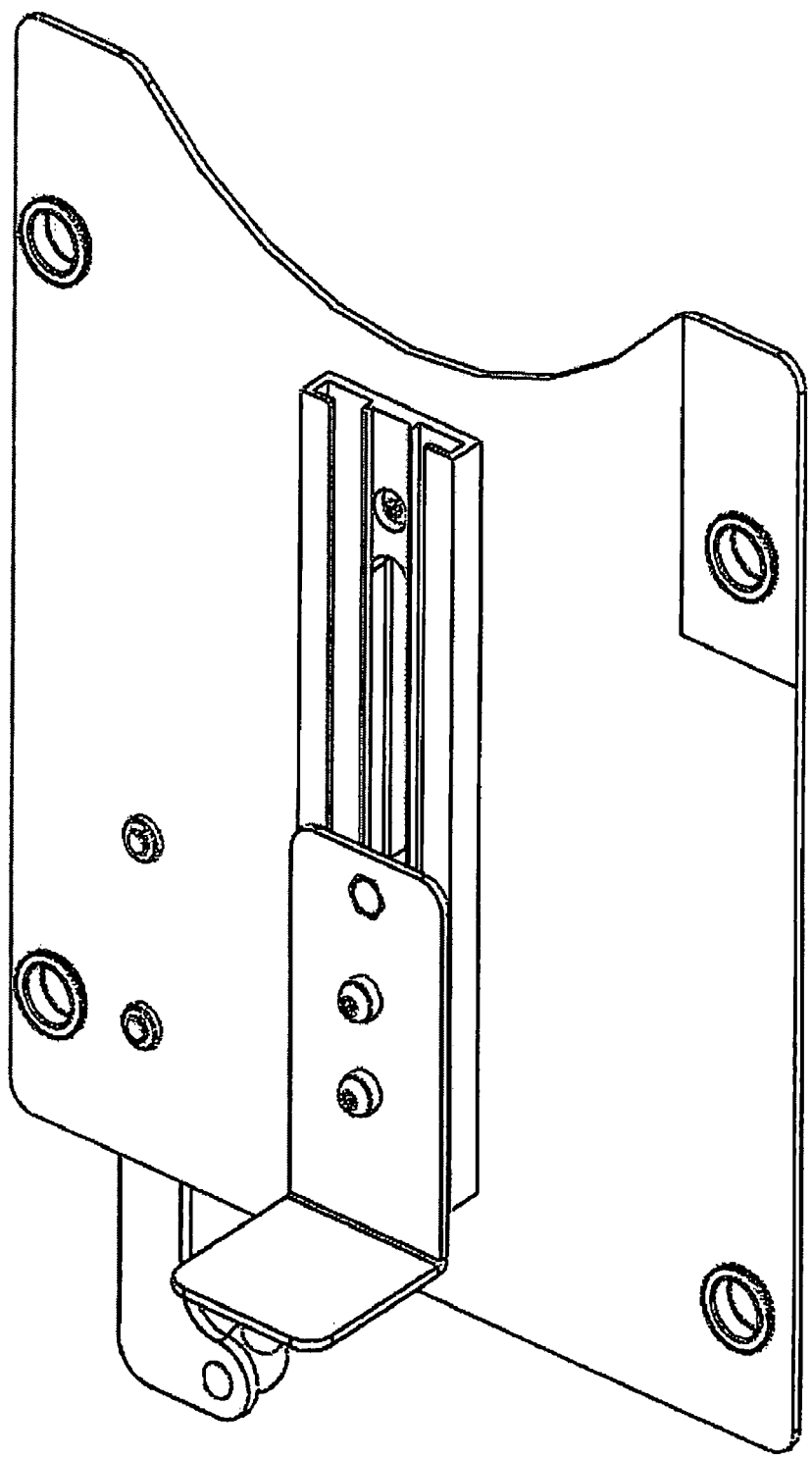
FIG. 2 shows a front perspective view of a device according to FIG. 1 when the dock is in use.

A preferred embodiment of the invention will now be described by reference to FIGS. 1 to 5. In one embodiment the device 10 of the invention comprises an abutment member 12 that may take the form of a generally "L-shaped" bracket having a bottom face 14 and a side face 16. Abutment member 12 is slidably mounted on dual tracks 18a and 18b; these tracks forming part of track mount 20. Track mount 20 has a front profile that is of a generally rectangular shape; tracks 18a and 18b being located along each side. Each track 18 has a "J-shaped" cross section within and along which a pair of guides (not shown) attached to the rear of side face 16 may slide. Track mount 20 also has a centrally located longitudinally extending slot 22 with semicircular ends. Track mount 20 is attached to the inner face of a portion P of the computer port this face having a further slot the same size as slot 22. Track mount 20 is attached such that these slots are coincident A pneumatic damping arm 24 located at the rear of portion P comprises a main body 26 with a first pivotably mounted attachment member 28 located at the upper extreme end. Damping arm 24 also further comprises rod 30 which is connected to a piston (not shown) located within main body 26. A second pivotally mounted attachment member 32 is connected to the free end of rod 30. This pivoting member is attached to an "L-shaped" bracket 34 which is secured to the rear face of portion P; while the first pivoting member 28 is attached to the rear of side face 16 and extends though slot 22.

Figure 3:
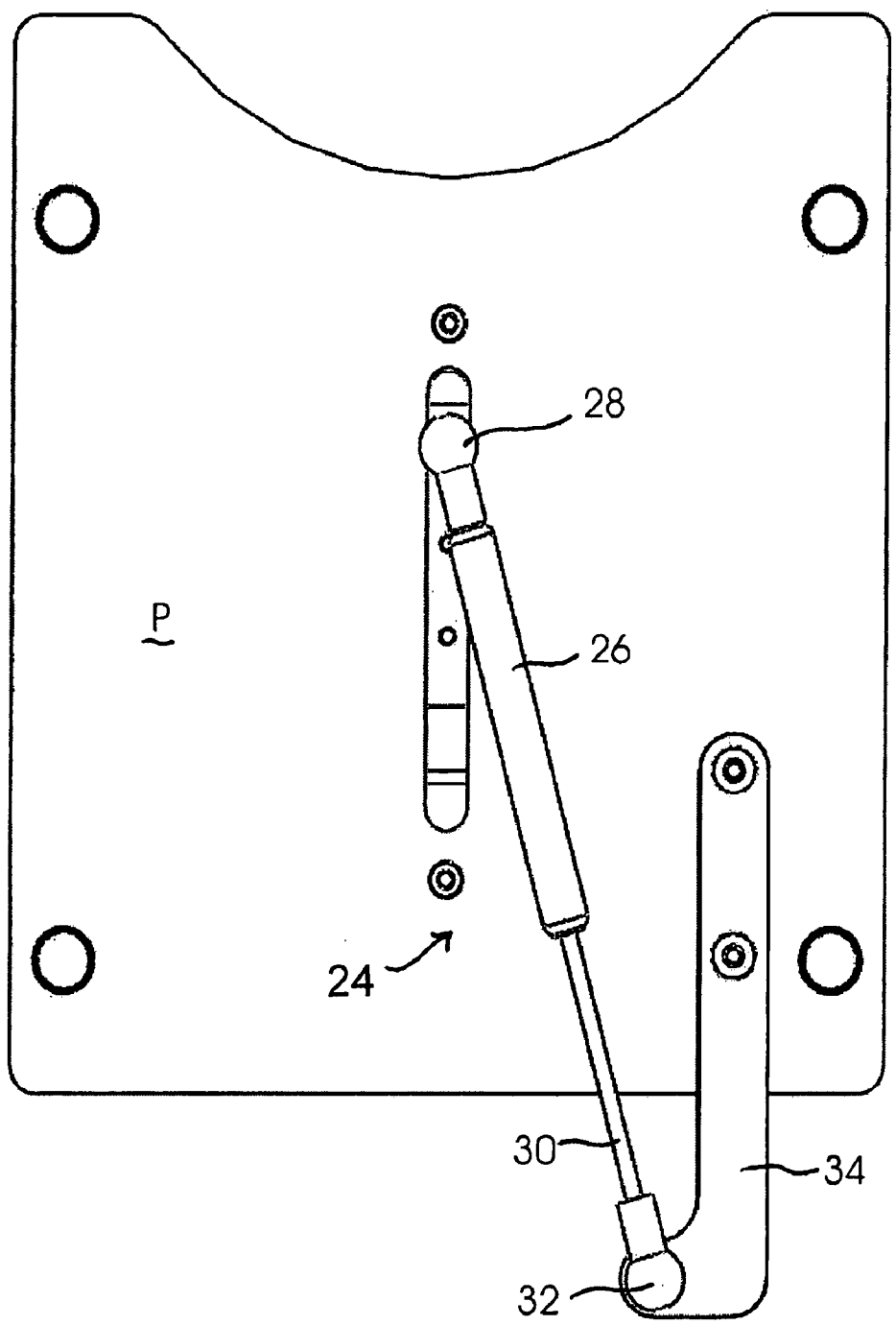
FIG. 3 is a rear elevation corresponding to FIG. 1.
Figure 4:
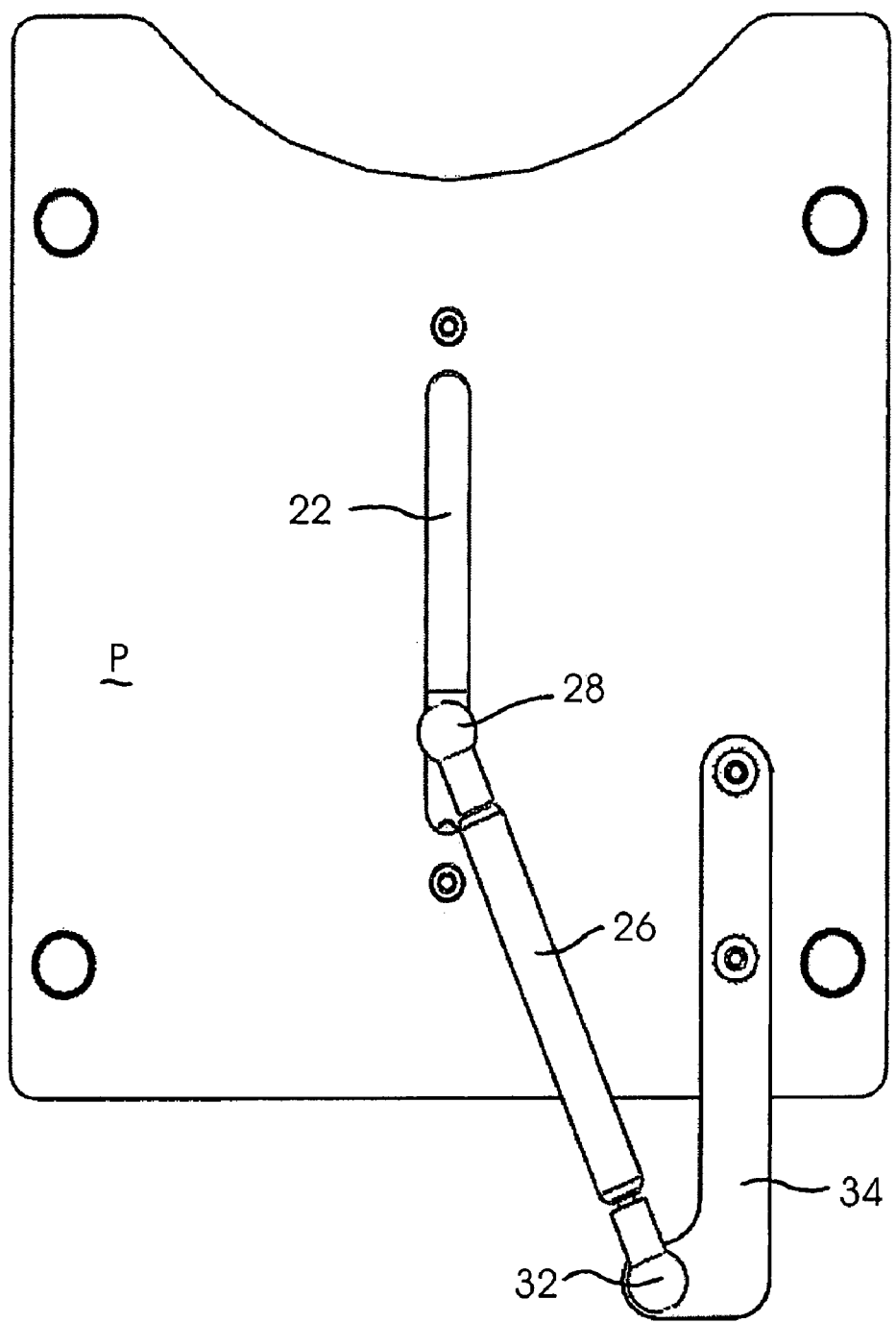
FIG. 4 is a rear elevation corresponding to FIG. 2.
Figure 5:
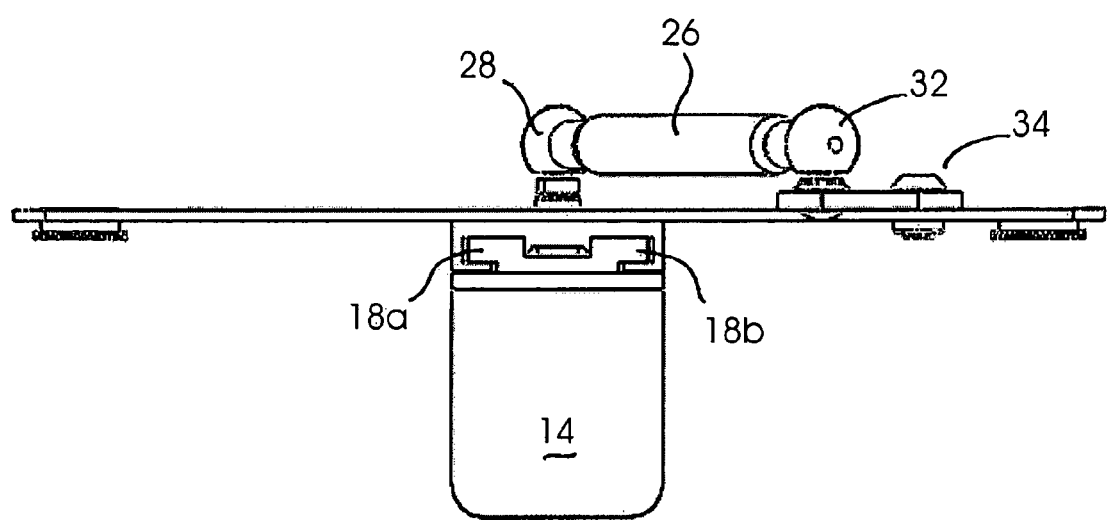
FIG. 5 is a plan view corresponding to FIG. 4.

FIG. 3 shows the rear view of the device mounted on portion P when the dock is not being used to store a computer and FIG. 4 shows how the pneumatic damping arm moves from a fully extended to a fully retracted position following insertion of a computer within a computer dock. In the position shown in FIG. 4 the downward force resulting from the mass of the computer is counteracted by a force that results from compression of damping arm 24.

Figure 6:
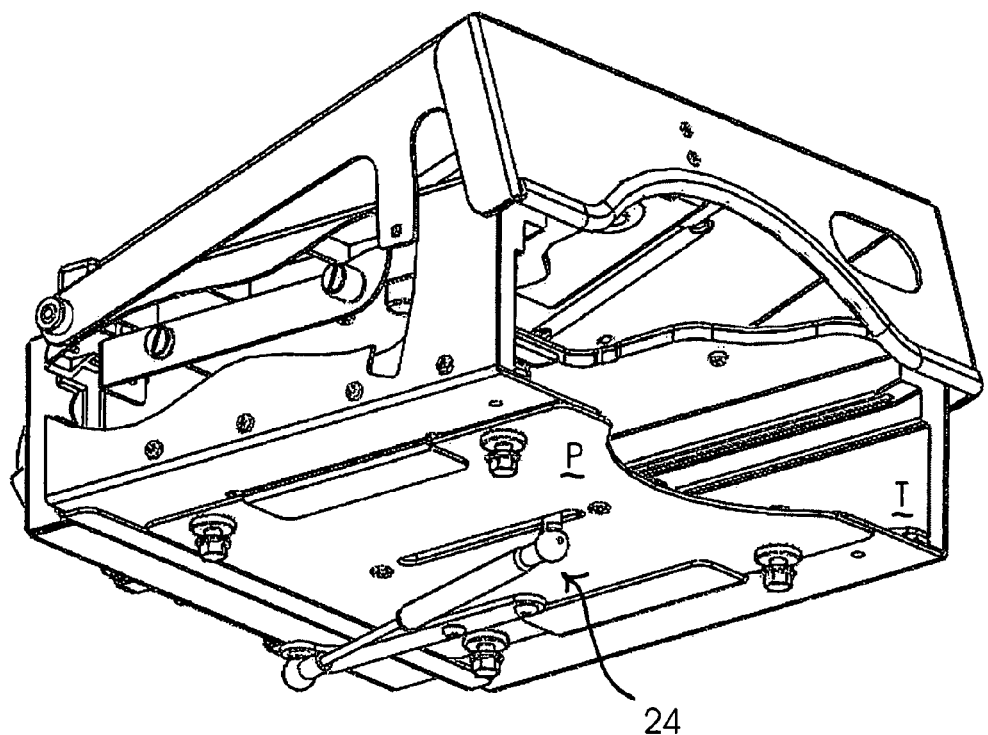
FIGS. 6 and 7 show a perspective views of the device as used within a computer dock.
Figure 7:
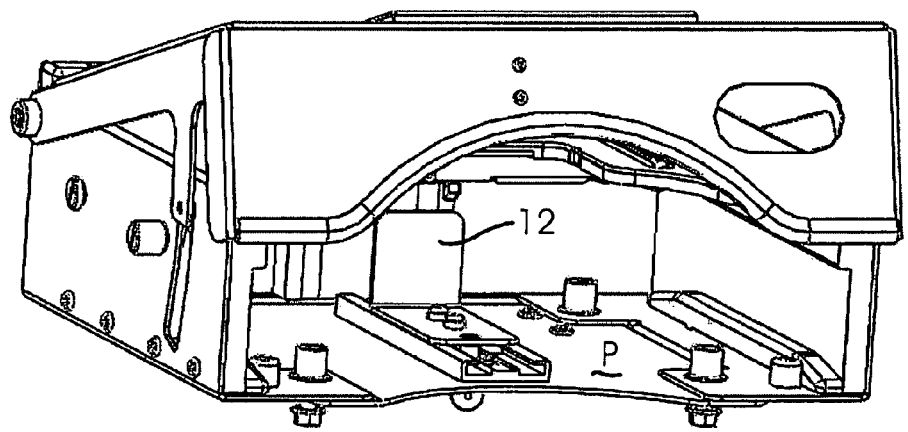

FIGS. 6 and 7 show the position of portion P of the dock in relation to the rest of the computer dock. While FIG. 7 shows (for clarity of illustration) the computer dock in a position ready to store a computer by horizontal insertion; normally in use the computer dock will be located such that portion P is vertical so that a computer is stored by vertical insertion within the dock.

In use as a computer is inserted downwardly between tracks T of the dock the rear face of the computer will abut against abutment member 12 which will start to be forced downwardly along tracks 18a and 18b at the same time preventing the computer from impacting the bottom of the dock as a result of falling under the influence of gravity. Thus, movement of the abutment member 12 and damping arm 24 advantageously prevents damage that might result from such impact. This includes physical damage to the computer and/or dock and also transient effects resulting from such an impact that can result in loss of data when a computer is inserted while running.

I claim:

1. A computer dock comprising a device for protecting a portable computer against damage during vertical or inclined insertion within the computer dock comprising:
    an abutment member biased to an upper position when the dock is not in use; said abutment member moving downwardly as a result of abutment against a portable computer during insertion and at the same time exerting an upward force that at least in part counteracts the downward force of gravity acting on the portable computer,
    wherein the abutment member is biased by resilient means, the resilient means being a spring or pneumatic damper, and
    wherein, in use, the longitudinal axis of the spring or pneumatic damper extends along a line that is at an acute angle to the direction of movement of the abutment member.

2. A computer dock according to claim 1 wherein the abutment member is slidably mounted.

3. A computer dock according to claim 1 wherein the abutment member comprises an arm that extends outwardly in a direction substantially at right angles to the direction of movement of the abutment member.

4. A computer dock according to claim 1 wherein a pivot joint is provided at one or both ends of said damper.

5. A computer dock according to claim 1 wherein one end of said damper is pivotally connected to said abutment member.

6. A computer dock according to claim 1 wherein the abutment member is "L-shaped".

7. A computer dock comprising:
    an enclosure including vertical or inclined first and second tracks to receive a portable computer between the tracks; the tracks being configured to accept insertion of the portable computer in only one direction;
    a device for protecting a portable computer against damage during vertical or inclined insertion within the computer dock, the device comprising an abutment member biased to an upper position when the dock is not in use; said abutment member moving downwardly as a result of abutment against the portable computer during insertion between the tracks and at the same time exerting an upward force that at least in part counteracts the downward force of gravity acting on the portable computer; and
    an electrical interface terminal, wherein the docking station is configured such that the electrical interface terminal can only make electrical contact with the portable computer when the portable computer is fully inserted in the computer dock.

8. A computer dock according to claim 7 wherein the tracks engage opposed edges of the portable computer.

9. A computer dock according to claim 7 wherein the computer dock is configured such that it may only be brought into a closed position when the portable computer is fully inserted in the computer dock.

10. A computer dock according to claim 7 wherein in an upper position, the abutment member is remote from a bottom part of the tracks.

11. A computer dock according to claim 7 wherein the enclosure is configured to enclose a portable computer on all sides when the portable computer is fully inserted into the dock and electrical contact has been made.

12. A computer dock according to claim 7 wherein the abutment member is biased by resilient means external to the enclosure.

13. A computer dock according to claim 7 wherein the portable computer being fully inserted into the dock and electrical contact being made can be visually verified.

* * * * *